United States Patent
Tu et al.

(10) Patent No.: US 8,223,481 B2
(45) Date of Patent: Jul. 17, 2012

(54) COMPUTER SYSTEM WITH FRAME FOR DISK DRIVE

(75) Inventors: Chen-Ruei Tu, Taipei Hsien (TW); Li-Ping Chen, Taipei Hsien (TW)

(73) Assignee: Hon Hai Precision Industry Co., Ltd., Tu-Cheng, New Taipei (TW)

( * ) Notice: Subject to any disclaimer, the term of this patent is extended or adjusted under 35 U.S.C. 154(b) by 354 days.

(21) Appl. No.: 12/695,678

(22) Filed: Jan. 28, 2010

(65) Prior Publication Data

US 2011/0110028 A1 May 12, 2011

(30) Foreign Application Priority Data

Nov. 10, 2009 (CN) ..................... 2009 2 0314472 U

(51) Int. Cl.
*G06F 1/16* (2006.01)
*G06F 1/20* (2006.01)
*H05K 5/00* (2006.01)
*H05K 7/20* (2006.01)

(52) U.S. Cl. .............. 361/679.33; 361/679.54; 361/704; 361/709; 361/719; 312/223.2

(58) Field of Classification Search ............ 361/679.02, 361/679.33, 679.54, 690, 704, 709, 719; 312/223.2
See application file for complete search history.

(56) References Cited

U.S. PATENT DOCUMENTS

| 5,124,885 | A | * | 6/1992 | Liu | 361/679.33 |
| 5,138,525 | A | * | 8/1992 | Rodriguez | 361/679.6 |
| 5,808,237 | A | * | 9/1998 | Hancock | 174/378 |
| 6,754,071 | B2 | * | 6/2004 | Lin et al. | 361/679.33 |
| 7,492,584 | B2 | * | 2/2009 | Fan et al. | 361/679.33 |
| 7,701,702 | B2 | * | 4/2010 | Chen et al. | 361/679.33 |
| 2008/0084146 | A1 | * | 4/2008 | Wang | 312/223.2 |
| 2011/0095664 | A1 | * | 4/2011 | Tu et al. | 312/223.2 |

* cited by examiner

*Primary Examiner* — Robert J Hoffberg
(74) *Attorney, Agent, or Firm* — Altis Law Group, Inc.

(57) ABSTRACT

A computer system includes a chassis and a frame. The chassis includes a chassis bottom wall, a first chassis sidewall connected to the chassis bottom wall, and a second chassis sidewall connected to the chassis bottom wall. The frame includes a mounting bracket and a retaining bracket. The mounting bracket is secured to at least one of the chassis bottom wall and the first and second chassis sidewalls. The mounting bracket defines a through opening configured for to have a disk drive inserted through the opening. The retaining bracket defines a holding space configured for receiving the disk drive. The through opening is in communication with the holding space. The mounting bracket includes a mounting bracket top wall. The retaining bracket includes a retaining bracket top wall. The retaining bracket top wall extends from the mounting bracket top wall.

13 Claims, 5 Drawing Sheets

COMPUTER SYSTEM WITH FRAME FOR DISK DRIVE

BACKGROUND

1. Technical Field

The present disclosure relates to a computer system with a frame for receiving a disk drive.

2. Description of Related Art

A disk drive bracket is provided in a computer system to receive disk drives. The computer system includes a chassis. The chassis includes a front wall. The front wall defines a through opening. The disk drive bracket is secured to the front wall by fasteners, such as screws or nuts. It is very inconvenient to secure the disk drive to the front wall.

BRIEF DESCRIPTION OF THE DRAWINGS

Many aspects of the embodiments can be better understood with references to the following drawings. The components in the drawings are not necessarily drawn to scale, the emphasis instead being placed upon clearly illustrating the principles of the embodiments. Moreover, in the drawings, like reference numerals designate corresponding parts throughout the several views.

DETAILED DESCRIPTION

The disclosure is illustrated by way of example and not by way of limitation in the figures of the accompanying drawings in which like references indicate similar elements. It should be noted that references to "an" or "one" embodiment in this disclosure are not necessarily to the same embodiment, and such references mean at least one.

Figure 1:
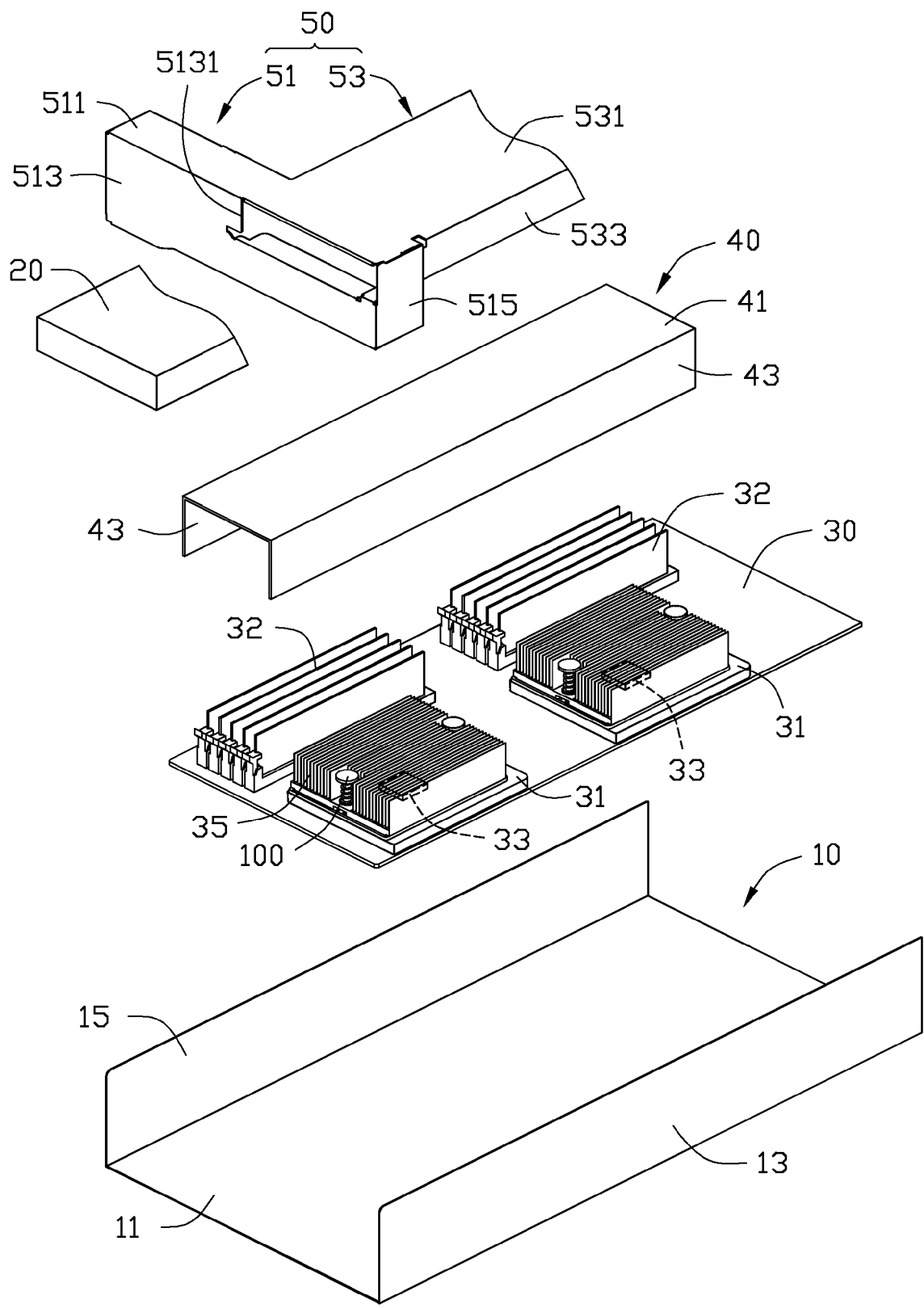
FIG. 1 is an exploded, isometric, partial view of a computer system in accordance with an embodiment.
Figure 2:
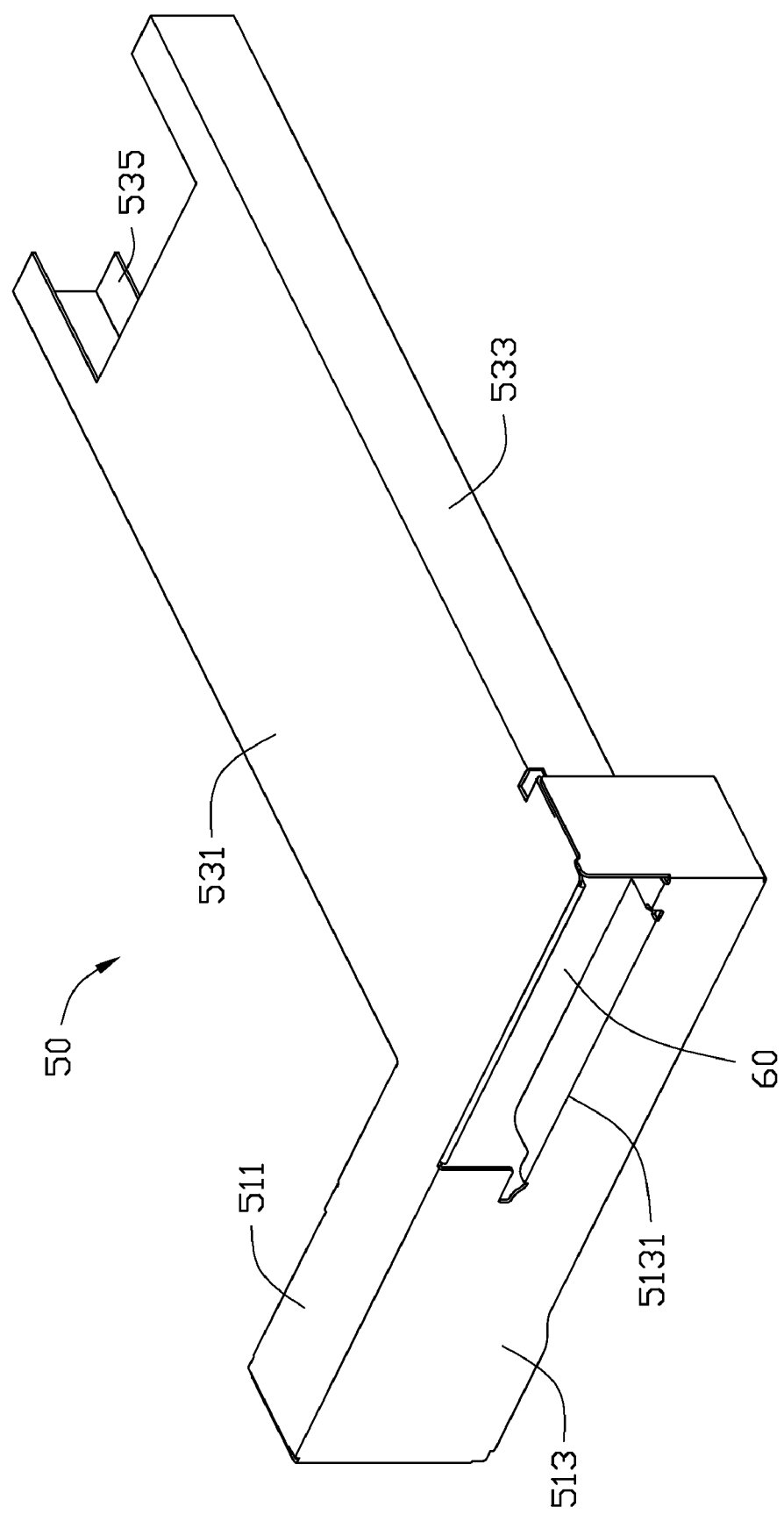
FIG. 2 is an isometric view of a frame of the computer system of FIG. 1.

Referring to FIG. 1, a computer system in accordance with an embodiment includes a chassis 10, a disk drive 20, a motherboard 30, a case 40, and a frame 50.

The chassis 10 is configured for receiving the motherboard 30, and includes a chassis bottom wall 11, and a first chassis sidewall 13 and a second chassis sidewall 15. In one embodiment, the first chassis sidewall 13 is perpendicular to the chassis bottom wall 11, and the second chassis sidewall 15 is parallel to the first chassis sidewall 13.

The frame 50 includes a mounting bracket 51 and a retaining bracket 53 integrated with the mounting bracket 51. The mounting bracket 51 includes a mounting bracket top wall 511, a mounting bracket front wall 513 perpendicular to the mounting bracket top wall 511, and two parallel mounting bracket sidewalls 515 perpendicular to the mounting bracket top wall 511 and the mounting bracket front wall 513. A through opening 5131 is defined in the mounting bracket front wall 513 and configured for the disk drive 20 to be inserted therethrough.

Figure 3:
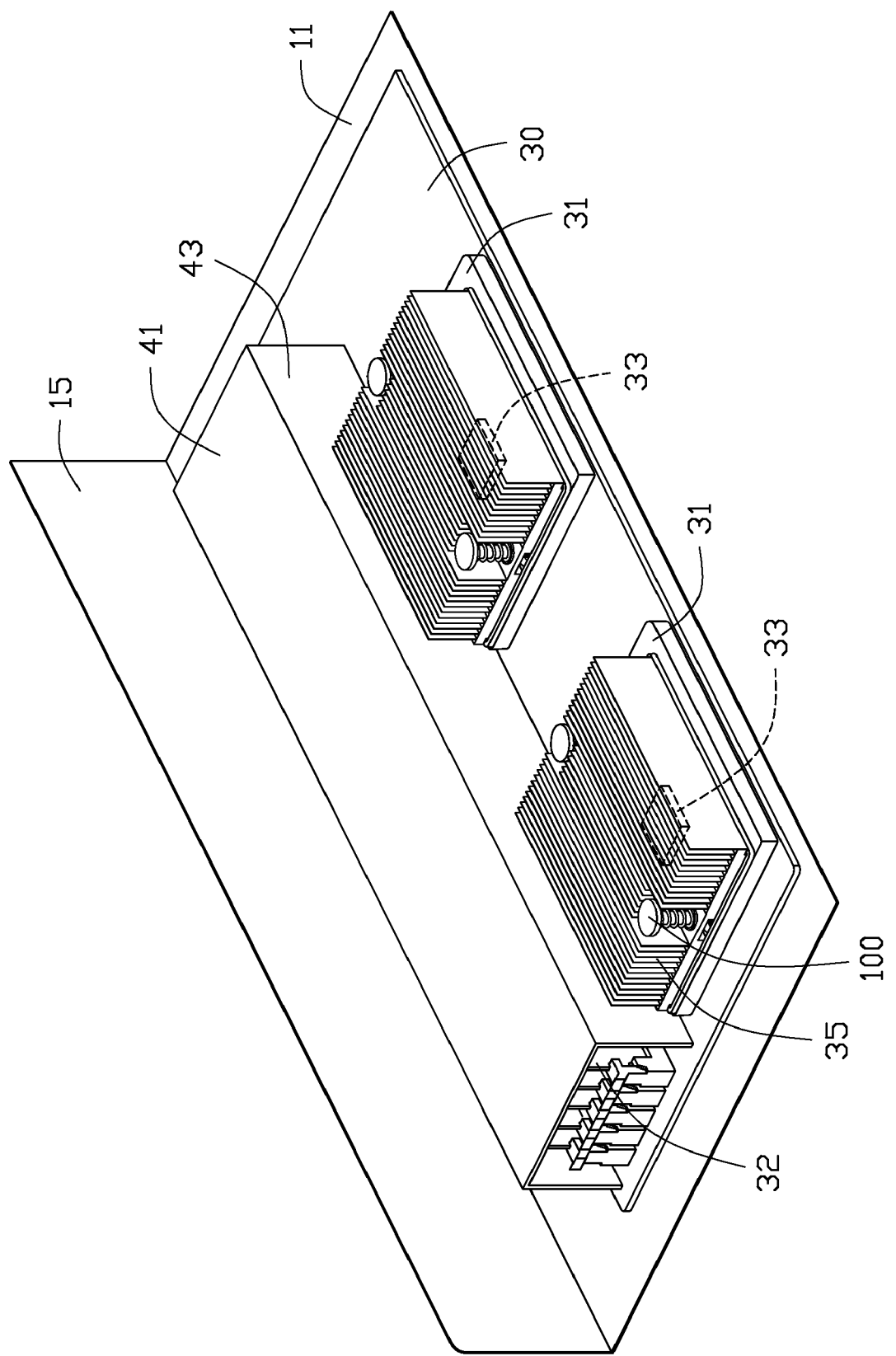
FIG. 3 is an assembled, cutaway view of a chassis, a case and a motherboard of the computer system of FIG. 1, and a first chassis sidewall is cut away.

The retaining bracket 53 includes a retaining bracket top wall 531, and two parallel retaining bracket sidewall 533 perpendicular to the retaining bracket top wall 531 and the mounting bracket front wall 513. The retaining bracket top wall 531 is integrated with and extends from the mounting bracket top wall 511. The retaining bracket sidewalls 533 are separated from the mounting bracket sidewalls 515. Referring also to FIG. 3, a flange 535 is bent inward from a bottom edge of each retaining bracket sidewall 533, for supporting the disk drive 20. The retaining bracket top wall 531, the retaining bracket sidewall 533 and the flanges 535 together define a holding space 60 configured for receiving the disk drive 20. The holding space 60 is in communication with the through opening 5131 of the mounting bracket 51.

The motherboard 30 is capable of being secured to an inner surface of the chassis bottom wall 11. Two chips 33, such as CPUs, are secured to the motherboard 30. Two securing components 31 are located on the motherboard 30, and each securing component 31 surrounds each chip 33. Two heat dissipating components 35 are secured to the securing components 31 using fasteners 100 respectively, for dissipating heat generated from the chips 33. Two group memory cards 32 are secured to the motherboard 30, and located at one side of the chips 33.

The case 40 is configured to cover the group memory cards 32, and includes a case top wall 41, and two parallel case sidewalls 43 perpendicular to the case top wall 41.

Referring also to FIG. 3, the motherboard 30 is secured to the chassis bottom wall 11. The case 40 is placed on the motherboard 30 and covers the two group memory cards 32. One of the case sidewalls 43 is positioned between the two group memory cards 32 and the dissipating components 35.

Figure 4:
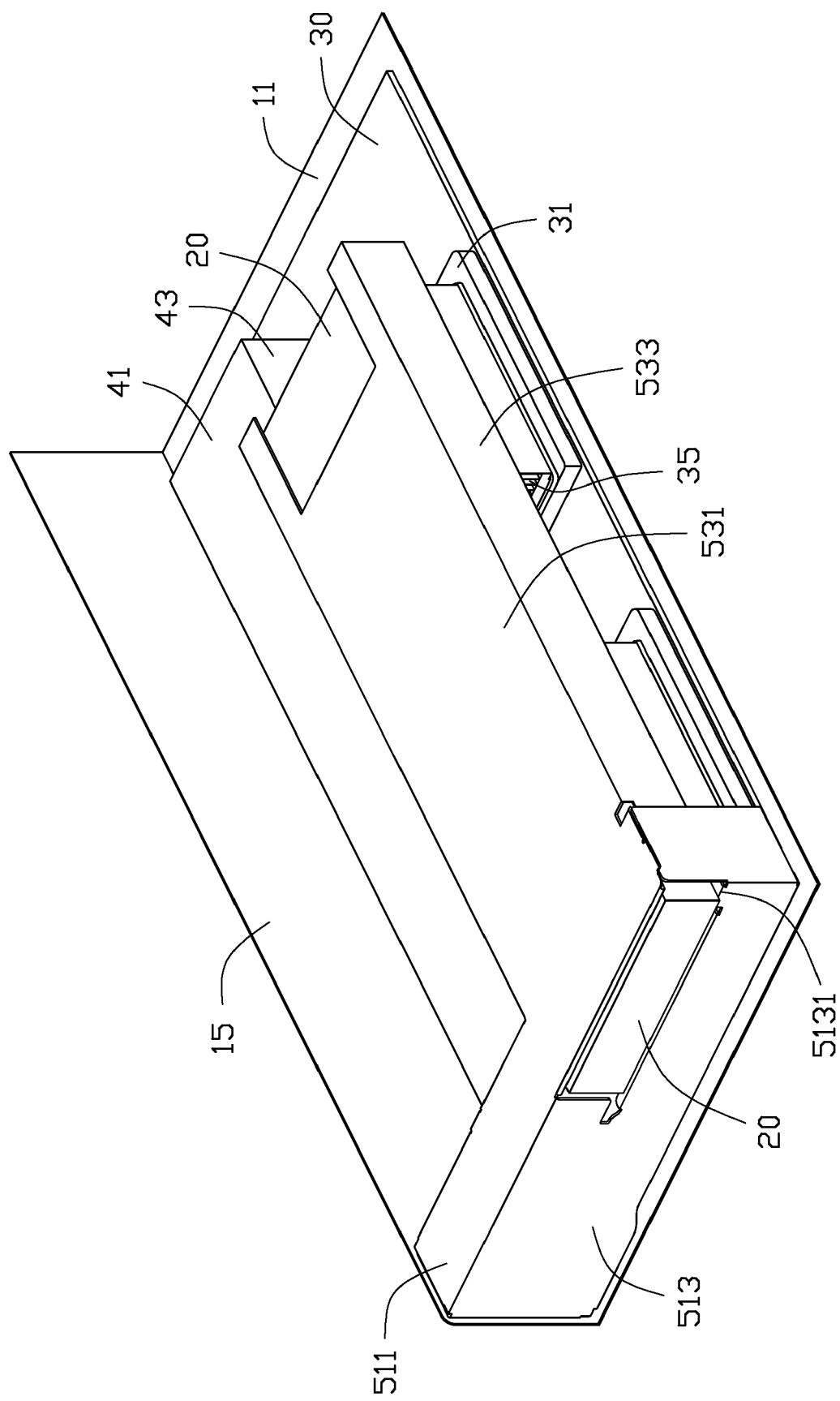
FIG. 4 is an assembled view of the chassis, the case, the motherboard and the frame of FIG. 1, and the first chassis sidewall is cut away.
Figure 5:
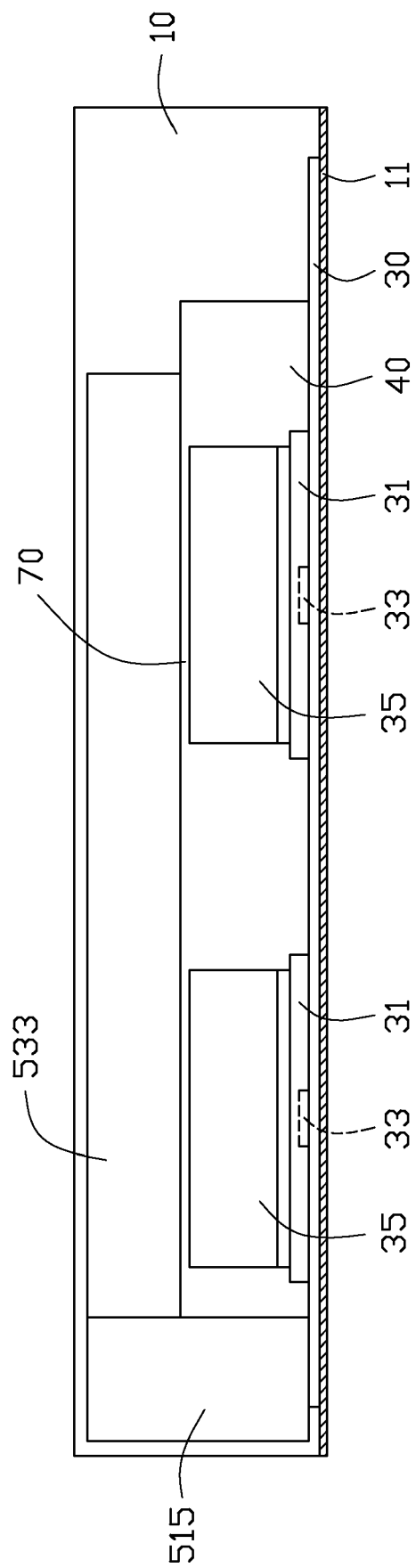
FIG. 5 is a right side view of FIG. 4.

Referring also to FIGS. 4-5, the frame 50 is placed in the chassis 10. The mounting bracket 51 is positioned at a front side of the motherboard 30 and the case 40.

The mounting bracket 51 also abuts the chassis bottom wall 11, the first and second chassis sidewalls 13, 15 (the chassis sidewall 15 not shown in FIG. 4). The retaining bracket 53 is positioned above the dissipating components 35, and the flanges 535 are substantially close to the heat dissipating components 35. A small distance 70 is defined between the flanges 535 and the heat dissipating components 35. The mounting bracket 51 is fixed on at least one of the chassis bottom wall 11 and the first and second chassis sidewalls 13, 15 by fasteners, such as screws or nuts. Therefore, the frame 50 is fixed in the chassis 10.

It is to be understood, however, that even though numerous characteristics and advantages have been set forth in the foregoing description of embodiments, together with details of the structures and functions of the embodiments, the disclosure is illustrative only and changes may be made in detail, especially in matters of shape, size, and arrangement of parts within the principles of the disclosure to the full extent indicated by the broad general meaning of the terms in which the appended claims are expressed.

What is claimed is:

1. A computer system comprising:

a chassis comprising a chassis bottom wall, a first chassis sidewall connected to the chassis bottom wall, and a second chassis sidewall connected to the chassis bottom wall; and a frame comprising:

a mounting bracket, the mounting bracket secured to at least one of the chassis bottom wall, the first chassis sidewall, and the second chassis sidewall, the mounting bracket abuts each of the chassis bottom wall and the first and second chassis sidewalls, the mounting bracket forming a front wall of the chassis, the mounting bracket comprising:

a mounting bracket top wall;

a mounting bracket front wall, the mounting bracket front wall defining a through opening configured for a disk drive to be inserted therethrough; and two parallel mounting bracket sidewalls that are substantially perpendicular to the mounting bracket front wall; and a retaining bracket, the retaining bracket defining a holding space configured for receiving the disk drive, the through opening of the mounting bracket being in communication with the holding space, the retaining bracket comprising:

a retaining bracket top wall; and two parallel retaining bracket sidewalls extending from opposite edges of the retaining bracket top wall, wherein the retaining bracket top wall extends from the mounting bracket top wall, the mounting bracket sidewalls are separated from the retaining bracket sidewalls, and the mounting bracket sidewalls are substantially perpendicular to the mounting bracket front wall.

2. The computer system of claim 1, wherein a motherboard is secured to the chassis bottom wall; a heat dissipating component is fixed on the motherboard for dissipating heat generated from a chip of the motherboard; and the heat dissipating component is positioned between the motherboard and the retaining bracket.

3. The computer system of claim 2, wherein two groups of memory cards are secured to the motherboard at one side of the heat dissipating component; and a case is disposed on the motherboard to cover the two groups of memory cards.

4. The computer system of claim 3, wherein the case is positioned at one side of the retaining bracket.

5. The computer system of claim 1, the retaining bracket further comprises flanges, each of the flanges is bent from a respective retaining bracket sidewall of the two parallel retaining bracket sidewalls; the flanges are substantially close to the heat dissipating component; and the retaining bracket top wall, the retaining bracket sidewalls, and the flanges together define the holding space.

6. The computer system of claim 1, wherein the first chassis sidewall is substantially perpendicular to the chassis bottom wall; and the second chassis sidewall is substantially parallel to the chassis first chassis sidewall.

7. A computer system comprising:

a chassis comprising a chassis bottom wall, a first chassis sidewall connected to the chassis bottom wall, and a second chassis sidewall connected to the chassis bottom wall; and a frame comprising:

a mounting bracket comprising:

a mounting bracket to wall;

a mounting bracket front wall, the mounting bracket front wall is secured to at least one of the chassis bottom wall and the first and second chassis sidewalls, the mounting bracket front wall abuts each of the chassis bottom wall and the first and second chassis sidewalls, the mounting bracket front wall forming a front wall of the chassis, and the mounting bracket front wall defines a through opening configured for a disk drive to be inserted therethrough; and two parallel mounting bracket sidewalls that are substantially perpendicular to the mounting bracket front wall; and a retaining bracket comprising:

a retaining bracket to wall; and two parallel retaining bracket sidewalls, each of the two parallel mounting bracket sidewalls is separated from each of the two parallel retaining bracket sidewalls, wherein the mounting bracket to wall and the retaining bracket top wall form a top wall, wherein the mounting bracket front wall and the retaining bracket sidewalls are bent from the top wall, the top wall and the two parallel retaining bracket sidewalls together define a holding space configured for receiving the disk drive, and the through opening being in communication with the holding space.

8. The computer system of claim 7, wherein a motherboard is secured to the chassis bottom wall; a heat dissipating component is fixed on the motherboard for dissipating heat generated from a chip of the motherboard; and the heat dissipating component is positioned between the motherboard and the retaining bracket.

9. The computer system of claim 8, wherein two groups of memory cards are secured to the motherboard at one side of the heat dissipating component; and a case is disposed on the motherboard to cover the two groups of memory cards.

10. The computer system of claim 9, wherein the case is positioned at one side of the retaining bracket.

11. The computer system of claim 8, the retaining bracket further comprises flanges, each of the flanges is bent from a respective retaining bracket sidewall of the two parallel retaining bracket sidewalls, the flanges are configured for supporting the disk drive; and the flanges are substantially close to the heat dissipating component.

12. The computer system of claim 7, wherein the retaining bracket sidewalls are substantially perpendicular to the mounting bracket front wall.

13. The computer system of claim 7, wherein the first chassis sidewall is substantially perpendicular to the chassis bottom wall; and the second chassis sidewall is substantially parallel to the first chassis sidewall.

* * * * *